T. L. BRIGGS, DEC'D.
I. M. BRIGGS, EXECUTRIX.
METHOD OF MAKING CHLOROSULPHONIC ACID.
APPLICATION FILED OCT. 4, 1921.
1,422,335.
Patented July 11, 1922.
2 SHEETS—SHEET 1.
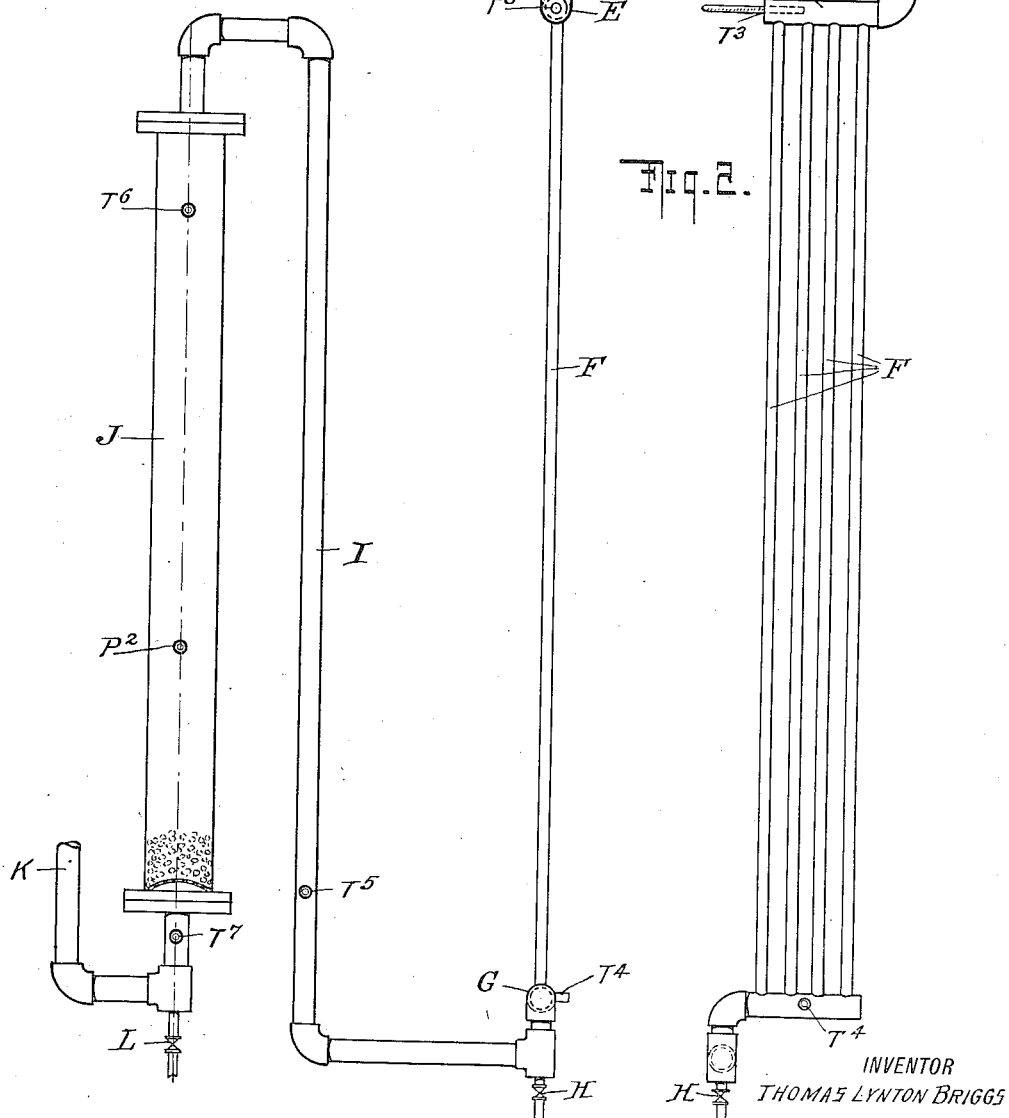
INVENTOR
THOMAS LYNTON BRIGGS
BY
ATTORNEYS

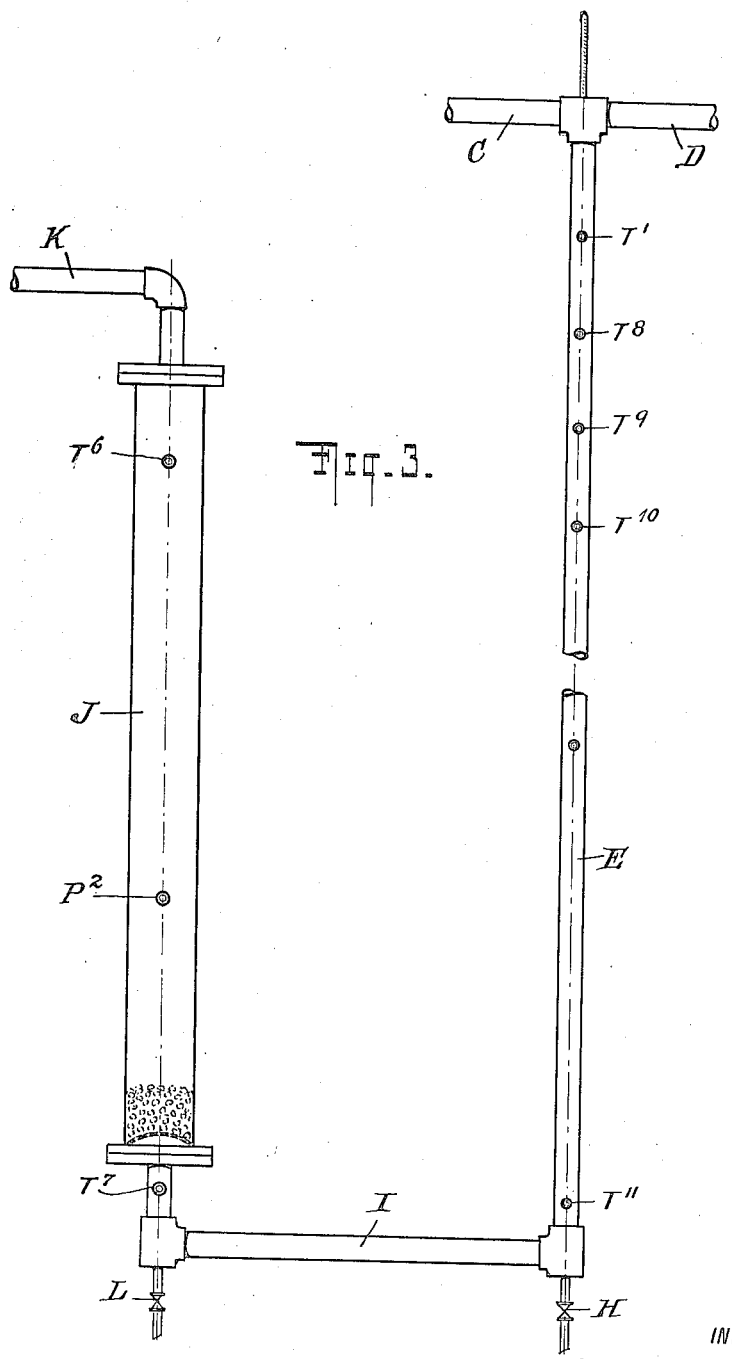

UNITED STATES PATENT OFFICE.

THOMAS LYNTON BRIGGS, DECEASED, LATE OF FLUSHING, NEW YORK, BY ISABELLE M. BRIGGS, EXECUTRIX, OF FLUSHING, NEW YORK, ASSIGNOR TO GENERAL CHEMICAL COMPANY, OF NEW YORK, N. Y., A CORPORATION OF NEW YORK.

METHOD OF MAKING CHLOROSULPHONIC ACID.

1,422,335.      Specification of Letters Patent.      Patented July 11, 1922.

Application filed October 4, 1921. Serial No. 505,361.

*To all whom it may concern:*

Be it known that THOMAS LYNTON BRIGGS, deceased, a subject of the King of Great Britain, and resident of Flushing, Long Island, borough of Queens, State of New York, invented certain new and useful Improvements in Methods of Making Chlorosulphonic Acid, of which the following is a specification.

The invention relates to the production of chlorosulphonic acid and has for its object to provide a process that shall be simple, economical and convenient. The process may be carried out in apparatus of extreme simplicity such as is shown in the accompanying drawings, in which Fig. 1 is a front elevation of apparatus suitable for carrying out the new process; Fig. 2 is a side or end elevation of the apparatus shown in Fig. 1 and Fig. 3 is a variant form of available apparatus.

Heretofore chlorosulphonic acid has been produced by a variety of processes, such, for example, as passing hydrochloric acid gas into a solution of sulfuric anhydrid in sulfuric acid and isolating the chlorosulphonic acid by distillation; or by bringing together hydrochloric acid gas with pure sulfuric anhydrid; or by introducing hydrochloric acid gas and gaseous sulfuric anhydrid into a body of chlorosulphonic acid; or by introducing hydrochloric acid gas and contact gas at opposite ends of water cooled towers; or by bringing together said two gases and introducing the resultant acid vapors into liquid chlorosulphonic acid. These known processes are each of them deficient in one respect or another and the avoidance of such deficiencies, while employing apparatus of simple construction, is one of the results of the new method of producing chlorosulphonic acid.

According to the present invention, sulfuric anhydrid in the form of contact gas (gas containing approximately 8% $SO_3$ and produced by the catalysis of gases containing $SO_2$ and oxygen) is continuously withdrawn from a source of supply through the pipe C. The pipe C is suitably valved as at C', so that the volume of the sulfuric anhydrid may be controlled. A supply of dry hydrochloric acid gas is sent through the opposed pipe D, which is also suitably valved at D'. The pipes C and D are illustrated as 2" pipes. The sulfuric anhydrid entering through the pipe C and the hydrochloric acid gas entering through pipe D are mixed in a chamber A, which is preferably an approximately 8" steel pipe having a perforated baffle-plate B contained therein. The sulfuric anhydrid is conducted from the contact apparatus to the mixer A at approximately 5-7" water pressure. The hydrochloric acid gas, generated in any suitable manner as by the action of concentrated sulfuric acid on aqueous hydrochloric acid, is introduced through pipe D at approximately 6-7" water pressure. The two gases when thus introduced to the mixer A combine almost instantaneously therein and it is probable that the reaction is practically complete by the time the gases leave the mixer A.

At various appropriate places throughout the apparatus thermometers in pockets designated as $T'$, $T^2$, $T^3$, $T^4$, $T^5$, $T^6$, $T^7$, indicate the course of the reaction and condensation. The temperature at $T'$ is maintained as nearly constant as possible, as a fall of temperature at this point indicates that an excess of either sulfuric anhydrid or hydrochloric acid is present. The operations are carried on with a slight excess of hydrochloric acid for the reason that the hydrochloric acid is very slightly soluble in chlorosulphonic acid, whereas sulfuric anhydrid is readily soluble, so that by having a slight excess of hydrochloric acid present at all times, a substantially pure product results. This excess of hydrochloric acid means a reacting temperature in the mixer A somewhat below the maximum obtainable, i. e. approximately 220° F. The rate of admission of the gases is regulated by the valves C' and D'. From the mixer A the gases, which now contain the mist or vapor of chlorosulphonic acid pass to the manifold E and thence downwardly through the four 1½" pipes F to the bottom manifold G. The liquid product which collects in the manifold G is withdrawn through the plug-cock H to storage. In this way the major part of the chlorosulphonic acid is secured and withdrawn and yields of from 66 to 83% of the total chlorosulphonic acid have been obtained from the apparatus as thus far described.

The uncondensed or non-liquid chlorosulphonic acid passes from the manifold G through the pipe I, illustrated as a 3" pipe to the top of the pipe J, in which substantially all the remaining chlorosulphonic acid is condensed. The pipe J, which may be an 8" steel pipe of approximately 7' in length, is packed with acid resisting material (such as peanut quartz) as indicated at the lower part of the pipe J. The residual gases leaving pipe J are discharged through exit pipe K and are practically waste, valueless gases. The product condensed in J is withdrawn through the plug-cock L to storage. The resistance of the entire apparatus to gas passage should not be greater than 6" of water and is indicated by pressure gauges designated as P' and P², which are located respectively in the pipes C and J. The apparatus as described, when operated under the conditions described, produces about 150-200 lbs. product per 24 hours. Given a fairly constant supply of sulfuric anhydrid and hydrochloric acid gas, the operation is easily controlled to admit the proper relative amounts of the gases and the functioning of the remaining parts of the apparatus is substantially automatic.

In Fig. 3 the special mixer is dispensed with in favor of a long 3" steel pipe E of approximately 16' in length near the lower end of which the withdrawal of liquefied chlorosulphonic acid is provided for at H, whereas the gases from which the liquid acid has been thus extracted i. e. the residual gases, enter the bottom of the pipe J instead of at the top, as in Fig. 1. The temperature pockets T⁸, T⁹, T¹⁰, T¹¹, T¹² of Fig. 3 serve as points of observation.

It will be observed that according to the foregoing process, the chlorosulphonic acid is formed almost instantaneously in the region where the dilute $SO_3$ gas and the dry HCl gas are introduced to each other under mixing conditions and that the resultant chlorosulphonic acid mist or vapor is then conducted through an extended channel or channels of relatively small dimension in a downward direction toward a draining chamber adapted for the withdrawal of the liquid acid and that only the residual gases which do not undergo liquefaction up to this point are then passed through the quartz-filled tower.

It will be apparent that in a system like that shown in Fig. 1, there may be many variations of form without departure from substance as, for example, with respect to the number of pipes F and many other details of a like nature; and the same thing is true of the apparatus shown in Fig. 3.

What I claim is:

1. Method of making chlorosulphonic acid which consists in separately conducting controlled volumes of contact gas and of dry hydrochloric acid gas to a mixing chamber and causing the said gases to become mixed therein, conducting the resulting chlorosulphonic acid vapors, together with accompanying fluids and gases, all in the same direction through a long passage of restricted diameter and withdrawing the accumulating liquid chlorosulphonic acid to storage.

2. Method of making chlorosulphonic acid which consists in separately conducting contact gas and dry hydrochloric acid gas, both under pressure and under control as to volume such that the hydrochloric acid gas is slightly in excess of the admitted sulfuric anhydrid of the contact gas, to a mixing chamber and causing the said gases to become mixed therein, conducting the resulting chlorosulphonic acid vapors, together with accompanying fluids and gases, all in the same direction through a long passage of restricted diameter and withdrawing the accumulating liquid chlorosulphonic acid to storage.

3. Method of making chlorosulphonic acid which consists in separately conducting controlled volumes of contact gas and of dry hydrochloric acid gas to a mixing chamber and causing the said gases to become mixed therein, conducting the resulting chlorosulphonic acid vapors, together with accompanying fluids and gases, all in the same direction through a long passage of restricted diameter and withdrawing the accumulating liquid chlorosulphonic acid to storage, then passing the residual gases to a tower packed with acid resisting material and withdrawing the accumulating liquid chlorosulphonic acid from said tower to storage.

4. Method of making chlorosulphonic acid which consists in separately conducting controlled volumes of contact gas and of dry hydrochloric acid gas to a mixing chamber and causing the said gases to become mixed therein, conducting the resulting chlorosulphonic acid vapors, together with accompanying fluids and gases, all in the same direction through a long passage of restricted diameter and withdrawing the accumulating liquid chlorosulphonic acid to storage, then passing the residual gases to the top of a tower packed with acid resisting material and withdrawing the accumulating liquid chlorosulphonic acid from the bottom of said tower to storage.

5. Method of making chlorosulphonic acid which consists in separately conducting controlled volumes of contact gas and of dry hydrochloric acid gas to a mixing chamber and causing the said gases to become mixed therein, conducting the resulting chlorosulphonic acid vapors, together with accompanying fluids and gases, all in the same direction through a series of long passages of restricted diameter and withdrawing the accumulating liquid chlorosulphonic acid to storage.

6. Method of making chlorosulphonic acid which consists in separately conducting controlled volumes of contact gas and of dry hydrochloric acid gas to a mixing chamber and causing the said gases to become mixed therein, conducting vapors of chlorosulphonic acid, together with accompanying gases, all in the same direction into a tower packed with acid resisting material and withdrawing from said tower the liquid chlorosulphonic acid collecting therein while intermediate between the said point of mixture of the original gases and said tower, the gases, vapors and liquid all move in the same direction and are passed through a long channel of restricted dimension to a collecting point for accumulating liquid chlorosulphonic acid, and withdrawing the liquid collected at said point.

7. Method of making chlorosulphonic acid which consists of making contact gas and dry hydrochloric acid gas and maintaining a temperature in the region of the mixing point of approximately 220° F., then causing the gases, vapors and liquids to move all in the same direction through long narrow channels and at a considerable distance from said mixing point withdrawing from said channels liquid chlorosulphonic acid accumulating therein.

8. Method of making chlorosulphonic acid which consists of making contact gas and dry hydrochloric acid gas and maintaining a temperature in the region of the mixing point of approximately 220° F., then causing the gases, vapors and liquids to move all in the same direction through long narrow channels and at a considerable distance from said mixing point withdrawing from said channels liquid chlorosulphonic acid accumulating therein, passing the remaining vapors and gases through a tower packed with acid resisting material and collecting from said tower the liquid chlorosulphonic acid accumulating therein.

In testimony whereof I have hereunto set my hand.

ISABELLE M. BRIGGS,
*Executrix of the last will and testament of Thomas Lynton Briggs, deceased.*